United States Patent
Van Oostrum et al.

(10) Patent No.: US 11,852,574 B2
(45) Date of Patent: Dec. 26, 2023

(54) METHOD FOR DETERMINING A THREE-DIMENSIONAL PARTICLE DISTRIBUTION IN A MEDIUM

(71) Applicant: Universität für Bodenkultur Wien, Vienna (AT)

(72) Inventors: Petrus Dominicus Joannes Van Oostrum, Vienna (AT); Erik Olof Reimhult, Vienna (AT)

(73) Assignee: Universität für Bodenkultur Wien, Vienna (AT)

( * ) Notice: Subject to any disclaimer, the term of this patent is extended or adjusted under 35 U.S.C. 154(b) by 598 days.

(21) Appl. No.: 17/057,743

(22) PCT Filed: May 7, 2019

(86) PCT No.: PCT/EP2019/061615
§ 371 (c)(1),
(2) Date: Nov. 23, 2020

(87) PCT Pub. No.: WO2019/228763
PCT Pub. Date: Dec. 5, 2019

(65) Prior Publication Data
US 2021/0199552 A1    Jul. 1, 2021

(30) Foreign Application Priority Data
May 28, 2018    (EP) ................... 18174605

(51) Int. Cl.
*G01N 15/02*    (2006.01)
*G06T 7/136*    (2017.01)
(Continued)

(52) U.S. Cl.
CPC ..... *G01N 15/0227* (2013.01); *G02B 27/4205* (2013.01); *G02B 27/48* (2013.01);
(Continued)

(58) Field of Classification Search
CPC ....... G01N 15/0227; G06T 7/136; G06T 5/50; G06T 2207/10101; G06T 2207/20024; G02B 27/4205; G02B 27/48
(Continued)

(56) References Cited

U.S. PATENT DOCUMENTS

| | | |
|---|---|---|
| 6,262,818 B1 | 7/2001 | Cuche et al. |
| 2016/0202163 A1 | 7/2016 | Weissleder et al. |
| 2017/0219998 A1 | 8/2017 | Hong et al. |

FOREIGN PATENT DOCUMENTS

| | | | |
|---|---|---|---|
| EP | 3260841 A1 | 12/2017 | |
| WO | 2011049965 A1 | 4/2011 | |
| WO | WO-2011072380 A1 * | 6/2011 | ........... A61B 5/0075 |

OTHER PUBLICATIONS

European Patent Office Search Report on Application No. 18174605.8-1001, dated Dec. 20, 2018.
(Continued)

*Primary Examiner* — Michael A Lyons
*Assistant Examiner* — Omar H Nixon
(74) *Attorney, Agent, or Firm* — Hoffmann & Baron, LLP

(57) ABSTRACT

The disclosed subject matter relates to a method for determining a three-dimensional particle distribution in a medium, comprising: emitting a coherent light beam to irradiate the sample; recording an interference image of the scattered light beam and a second part of the light beam that has not been scattered; computing, from the interference image, for each one of a plurality of virtual planes lying within the sample, a reconstructed image of the sample, generating for each reconstructed image, a presence image, wherein a value is assigned to each pixel of the presence images if the corresponding pixel of the reconstructed image has an intensity value exceeding a threshold value and if the
(Continued)

corresponding pixel of the reconstructed image has a phase value with a predetermined sign.

10 Claims, 2 Drawing Sheets

(51) Int. Cl.
    *G02B 27/42* (2006.01)
    *G02B 27/48* (2006.01)
    *G06T 5/50* (2006.01)

(52) U.S. Cl.
    CPC ............... *G06T 5/50* (2013.01); *G06T 7/136* (2017.01); *G06T 2207/10101* (2013.01); *G06T 2207/20024* (2013.01)

(58) Field of Classification Search
    USPC ........................................................ 356/337
    See application file for complete search history.

(56) References Cited

OTHER PUBLICATIONS

Patent Cooperation Treaty Written Opinion and International Search Report on Application No. PCT/EP2019/061615, dated Oct. 7, 2019.

International Preliminary Report on Patentability in corresponding International Application No. PCT/EP2019/061615 dated May 26, 2020.

Lee, et al., Holographic microscopy of holographically trapped three-dimensional structures, Optics Express 15(4), pp. 1505-1512 (2007).†

Lee, et al., Characterizing and tracking single colloidal particles with video holographic microscopy, Optics Express 15(26), pp. 18275-18282 (2007).†

Wang, et al., Holographic characterization of protein aggregates, Journal of Pharmaceutical Sciences 105(3), pp. 1074-1085 (2016) (accepted manuscript provided).†

\* cited by examiner
† cited by third party

METHOD FOR DETERMINING A THREE-DIMENSIONAL PARTICLE DISTRIBUTION IN A MEDIUM

CROSS-REFERENCE TO RELATED APPLICATIONS

This application is a National Phase application of International Application No. PCT/EP2019/061615 filed May 7, 2019 which claims priority to European Patent Application No. 18 174 605.8 filed May 28, 2018, the disclosures of which are incorporated herein by reference.

TECHNICAL FIELD

The disclosed subject matter relates to a method for determining a three-dimensional particle distribution, e.g. a bacteria distribution, in a medium.

BACKGROUND

The background of the disclosed subject matter lies in the field of observing colloids such as bacteria in a medium, for example to study bacterial onset of urinary tract infections. Moreover, plastic particles in ocean water, impurities in liquid foods or pharmaceuticals, or cells in bodily fluids could be observed. For bacteria distributions, it is known to observe the movement of bacteria in a medium by means of digital holographic microscopy. In such methods, a sample containing said bacteria is irradiated with coherent light to obtain an interference image thereof. From this, in turn a three-dimensional model of the bacteria distribution can be computed by applying a reconstruction algorithm onto the interference image, for example a back propagation or back projection algorithm. However, experiments have shown that the three-dimensional model obtained in this way is often qualitatively unsuited for a detailed analysis.

To overcome this problem, in the state of the art it is known to perform spatial filtering or time averaging steps on the interference image to generate a background image. This image contains information on fringes related to objects that are not of interest and that can be removed from the interference image by division or by subtraction of said background image. Thereafter, the reconstruction algorithm is performed on the thus "cleansed" interference image to determine the three-dimensional particle distribution. However, these processing steps have the disadvantage that the overall quality of the three-dimensional model is still insufficient in some cases. The problem arising here is that objects that scatter much light have fringes, which are easily mistaken for less brightly scattering objects.

BRIEF SUMMARY

It is therefore an object of the disclosed subject matter to provide a method for determining a three-dimensional particle distribution with a qualitatively high output that is furthermore computationally easy to perform.

This aim is achieved by means of a method for determining a three-dimensional particle distribution, e.g. a bacteria distribution, in a medium, comprising: providing a sample of the medium containing said particles; emitting a coherent light beam by means of a light source to irradiate the sample with said light beam, wherein a first part of the light beam is scattered by the particles to create a scattered light beam; recording, with a camera, an interference image of the scattered light beam and a second part of the light beam that has not been scattered; computing with a processor, from the interference image, for each one of a plurality of virtual planes lying within the sample, a reconstructed image of the sample at the respective virtual plane, each reconstructed image having a plurality of pixels with an intensity value and a phase value, generating with said processor, for each reconstructed image, a presence image having a same layout of pixels as the reconstructed image, wherein a value is assigned to each pixel of the presence images if the corresponding pixel of the reconstructed image has an intensity value exceeding a threshold value and if the corresponding pixel of the reconstructed image has a phase value with a predetermined sign, and wherein no value is assigned if at least one of said two conditions is not met, and identifying the three-dimensional particle distribution from those pixels of the presence images that have assigned values.

This method has the advantage that the quality of the determined three-dimensional particle distribution is increased by applying a special filter algorithm on each reconstructed image, i.e., not on the interference image subject to the reconstruction algorithm but on the "slices" of the reconstructed sample.

It has been found that each particle causes an intensity pattern with multiple maxima in the reconstructed images. The two disclosed filtering steps allow to delete those intensity values that cause the "outer" maxima, i.e., those intensity maxima that do not correspond to the actual particle. This makes the particle appear clearer as its edges are less blurred in the three-dimensional particle distribution, allowing for an improved statistical analysis, for example. The method thus manages to remove second, third, et cet. intensity maxima around the particle by means of a computationally efficient algorithm, only needing to compute two values for each pixel in a straightforward manner.

Optionally, the method comprises the step of, after scattering and before recording, directing the scattered light beam onto the camera by means of an optical device having a focal point lying outside of the sample. By having an optical device whose focal point lies outside of the sample, a large volume of the sample can be depicted in the interference image. Furthermore, the optical device allows the interference image (holographic image) to be magnified to a certain degree, which allows for a more detailed computational analysis. If the focal point alternatively lies with-in the sample, the phase values of the reconstructed images are only present outside of a plane of the focal point.

In this embodiment, said predetermined sign is optionally dependent on the side, seen in the direction of the light beam, of the sample said focal point is located on as well as on the refractive index of the medium in relation to the refractive index of the particles. In an exemplary scenario, the predetermined sign is positive if the focal point lies between the camera and the sample and if the refractive index of the medium is lower than the refractive index of the particles. Each change of one of these criteria causes the sign to flip once. This has the advantage that the predetermined sign can be determined before performing the method, i.e., no trial and error is needed to determine the sign.

Further optionally, the virtual planes are each spaced apart with a predetermined interval and cover the whole sample. This causes the reconstructed images and thus the presence images to be located in equal distances from each other such that each pixel of the presence image can be assigned a predetermined "height" (corresponding to the third dimension in the particle distribution) that equals the predetermined intervals.

The sample, light source, and camera could be embodied as any interferometer known in the state of the art. For example, a part of the emitted light beam could be branched off, by means of a beam splitter, and combined with the scattered light beam before recording with the camera. However, experiments have shown that beam-splitting is prone to vibrations. Optionally, the method includes providing an in-line interferometer comprising the light source, the sample, and the camera.

The camera can be embodied in any type known in the state of the art capable of recording interference images. Optionally, the camera is a digital camera, e.g. a Complementary Metal-Oxide Semiconductor (CMOS) or a Charge Coupled Device (CCD). This allows an especially efficient computational analysis of the recorded interference image as it can easily be processed digitally. Furthermore, CMOS s and CCDs are readily available with high resolutions.

Optionally, the method comprises using an inverse Radon transformation to compute the reconstructed images. The inverse Radon transformation may be used as it has been optimized for similar purposes. Generally, other reconstruction algorithms such as an iterative reconstruction algorithm or a Fourier-domain reconstruction algorithm can be used for determining the reconstructed images too.

To determine a movement of the particles in the medium, the method can comprise repeating the steps of emitting, irradiating, recording, generating, and identifying to determine a first and a second particle distribution, and correlating at least one particle in the first particle distribution to the same particle in the second particle distribution to track a movement of said particle. Thus, two three-dimensional particle distributions are determined and the individual particles are tracked between the two distributions. To correlate one particle to the same particle in the other distribution, additional constraints can be set, such as a maximum particle speed.

Optionally, the method comprises the step of projecting the three-dimensional particle distribution onto a two-dimensional plane corresponding to the plane of the interference image. This allows to obtain a two-dimensional image that corresponds to the view of the interference image. In other words, through computing the reference images, generating the presence images through the two filtering conditions, and projecting back to a two-dimensional plane, the interference image is cleared from the effects of interference and is then available in a form in which each particle is easily identifiable.

Favorably, the threshold value is computed for each pixel of at least one of the reconstructed images as a pre-determined percentage of the average intensity values of pixels within a predetermined range of said pixel. This allows for adjusting the threshold value to a level that is in line with the local intensity level. By computing the threshold for each pixel of one of the reconstructed images, a "threshold map" is generated. Since the threshold map depicts the scattering strength of the particles, samples can be analyzed that contain both strongly and weakly scattering particles. Thus, the quality of the output of the method is not affected even if a part of one reconstructed image has low intensities and a different part has high intensities.

In another embodiment, the method comprises the step of determining the threshold value to lie between a second and a third maximum intensity value of a reference intensity distribution. The predetermined threshold is thus chosen in such a way that it lies between the second and third intensity maxima such that this criterion allows for the deletion of the third, forth, et cet. intensity maxima. The predetermined sign then corresponds to the phase value of the second intensity maximum and this allows for its deletion.

BRIEF DESCRIPTION OF THE DRAWINGS

The disclosed subject matter shall now be explained in more detail below on the basis of exemplary embodiments thereof with reference to the accompanying drawings, in which.

DETAILED DESCRIPTION

Figure 1:
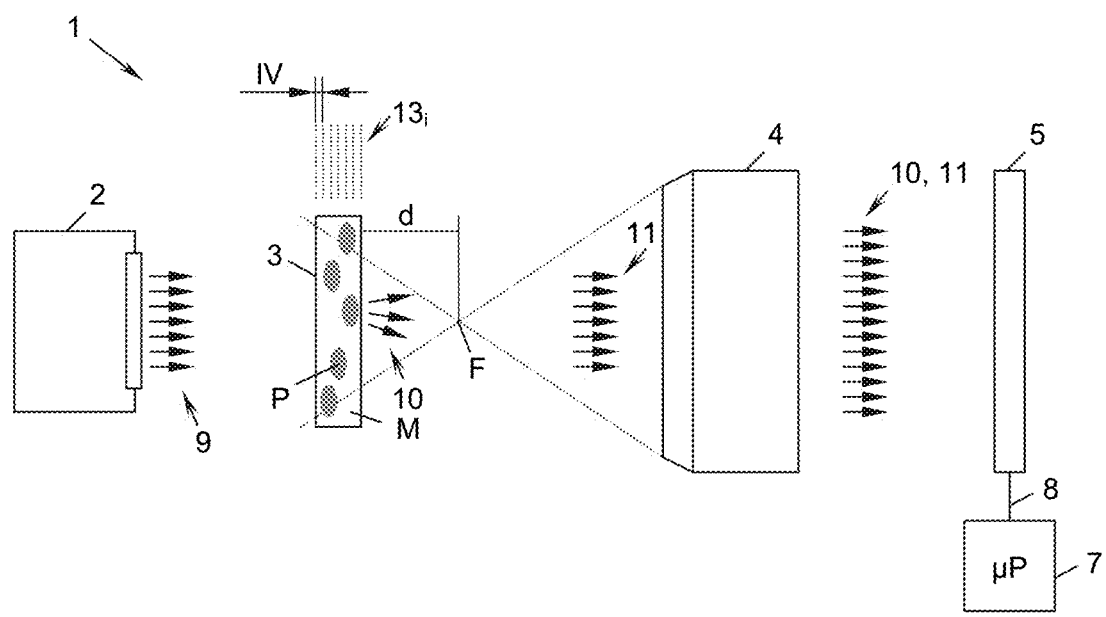
FIG. 1 shows an inline interferometer used for the disclosed method in a schematic side view.

FIG. 1 shows an inline interferometer 1 comprising a light source 2, a sample 3, an optical device 4, and a camera 5. The sample 3 comprises a medium M containing (microscopic) particles P. In one embodiment, the particles P could be bacteria and the medium M could be water, blood, a solution, or the like. In a different embodiment, the particles P could be charged particles in water or oil to study, e.g., electrophoresis.

The inline interferometer 1 is used to determine a three-dimensional particle distribution 6 (FIG. 3), which can be determined by means of a processor 7 connected to the camera 5 by means of an interface 8.

Based on the examples depicted in FIGS. 2 and 3, the method for determining said three-dimensional particle distribution 6 will be detailed in the following.

At the outset, the light source 2 emits a coherent light beam 9 to irradiate the sample 3 with said light beam 9. In the present method, the coherence length can be fine-tuned as too many speckles can occur in the three-dimensional particle distribution 6 if the coherence length is chosen to be too small. The light source 2 can be of any kind that is capable of emitting a coherent light beam 9, for example a laser diode.

Once the light beam 9 irradiates a sample 3, a first part of the light beam 9 is scattered by the particles P to create a scattered light beam 10. Depending on the choice of medium M and particles P, the percentage of scattered light can vary. In the example of bacteria and water, approximately five percent of the light beam 9 is scattered. In the shown embodiment, a second part of the light beam 9 has not been scattered by the particles P and traverses the sample 3 as a non-scattered light beam 11. In the present specification, scattering can mean diffracting, refracting, or reflecting, and is dependent on the choice of interferometer 1 used, which in turn may depend on the nature of the particles, e.g., their transparency, reflectivity, or refractivity.

After the light beam 9 has traversed the sample 3 as a scattered light beam 10 and a non-scattered light beam 11, the scattered light beam 10 can be magnified by means of the optical device 4, which is optional in some embodiments. The optical device 4, as known in the state of the art for inline interferometers 1, can be construed to make the scattered light beam 10 interfere with the non-scattered light beam 11. For this purpose, the optical device 4 can have a focal point F lying outside of the sample 3 at a predetermined distance d thereto, which also helps to further magnify the interference image 12. The focal point F can lie on any side of the sample 3, seen in the direction of the light beam 9.

The interferometer 1 can also be embodied as another type of interferometer than an inline interferometer, for example as an interferometer 1 utilizing beam-splitters. For example, one beam-splitter could be arranged between the light source 2 and the sample 3 to branch off a part of the unscattered light beam 9, which could at a later stage be merged with the scattered light beam 10 such that the two beams 10, 11 interfere.

At the end of the path of the light beam 9, the camera 5 records an interference image 12 of the scattered light beam 10 and the non-scattered light beam 11. The camera 5 can for this purpose be any analogue or digital camera, for example, a Complementary Metal-Oxide Semiconductor (CMOS) or a Charge Coupled Device (CCD). However, other cameras 5 such as cameras with an active pixel sensor (APS) could be used alternatively.

After the camera 5 records the interference image 12, the camera 5 forwards the interference image 12 to the processor 7 via the interface 8, and processing is performed to obtain the three-dimensional particle distribution 6 from the interference image 12. The camera 5 records the interference image 12 as a purely two-dimensional image. However, this interference image 12 encodes intensity as well as phase information. This information allows the processor 7 to "reconstruct" the three-dimensional sample 3 in a first step $S_1$.

Figure 3:
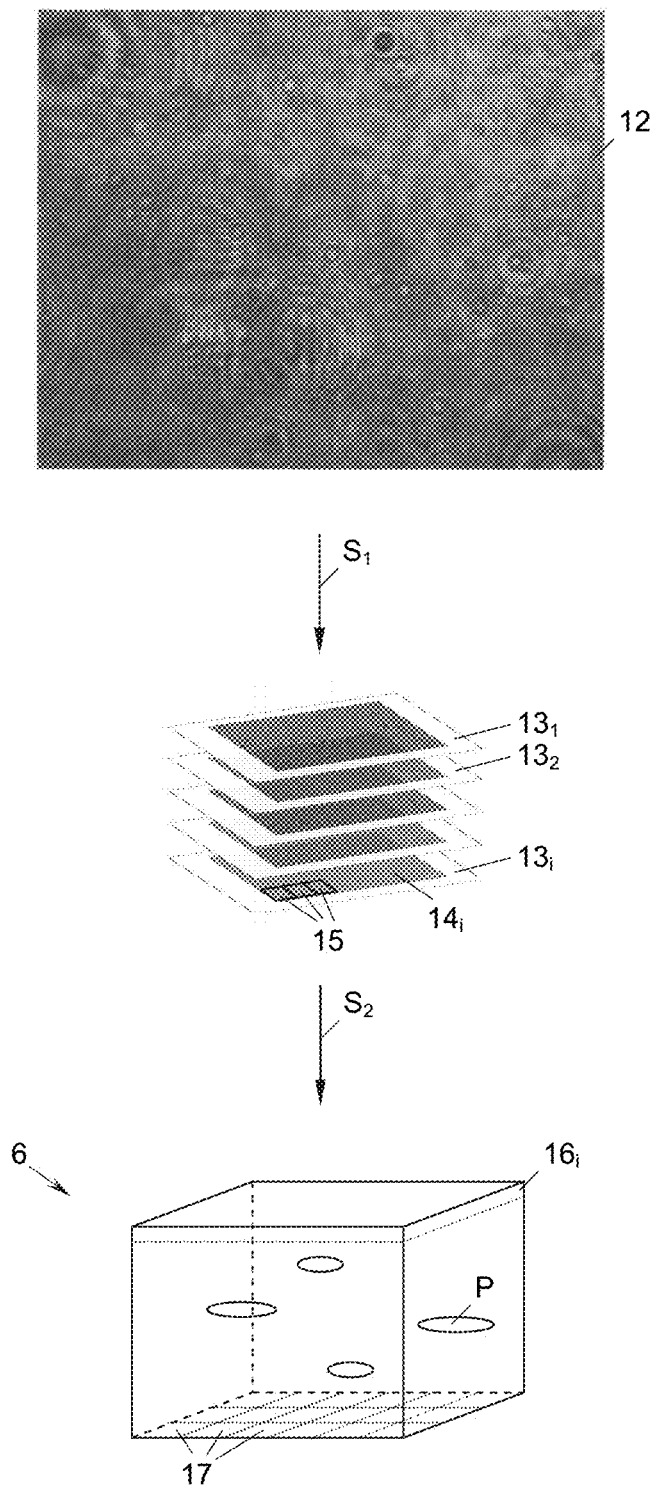
FIG. 3 schematically shows an interference image, a plurality of reconstructed images, and a three-dimensional particle distribution as an output of the method of FIG. 1.

As shown in FIG. 3, in step $S_1$ a plurality of virtual planes $13_1, 13_2, \ldots$, generally $13_i$, can be defined within the sample 3. Optionally, the virtual planes $13_i$ are each spaced apart with a predetermined interval IV (FIG. 1) and cover the whole sample 3, which alleviates processing. Each virtual plane $13_i$ thus has a different distance to the camera 5.

Alternatively, the virtual planes $13_i$ could be spaced apart with different intervals IV. The three-dimensional particle distribution 6 could then be generated by incorporating different factors for the different intervals IV.

A reconstruction algorithm can now be applied onto the interference image 12 to compute a reconstructed image $14_1, 14_2, \ldots$, generally $14_i$, for each virtual plane $13_i$. In the state of the art, multiple variants of reconstruction algorithms exist, some of which are known in the state of the art as back propagation or back projection algorithms, e.g., an inverse Radon transformation.

While in the interference image 12 usually only intensities are recorded, it is possible to therefrom determine both intensity and phase information for each reconstructed image $14_i$. Each reconstructed image $14_i$ is thus computed to have a plurality of pixels 15 with an intensity value I and a phase value $\Phi$.

After computing the reconstructed images $14_i$, the processor 7 generates in a second step $S_2$ for each reconstructed image $14_i$ a presence image $16_1, 16_2, \ldots$, generally $16_i$, wherein each presence image $16_i$ has the same layout of pixels 17 as the corresponding reconstructed image $14_i$. This means that the presence images $16_i$ have the same amount of pixels 17 arranged in the same manner, i.e., arranged in the same array. A pixel 17 of the presence image $16_i$ corresponds to a pixel 15 of the reconstructed image $14_i$ if it has the same position in the array. While the pixels 15 of the reconstructed image $14_i$ have stored intensity information I as well as phase information $\Phi$, the pixels 17 of the presence image $16_i$ have either a value assigned or no value assigned, depending on two criteria. Specifically, the processor 7 assigns a value to each pixel 17 of the presence images $16_i$ if the corresponding pixel 15 of the reconstructed image $14_i$ has an intensity value I exceeding a predetermined threshold value TH and if the corresponding pixel 15 of the reconstructed image $14_i$ has a phase value $\Phi$ with a predetermined sign SG. The processor 7 assigns no value if at least one of said two conditions is not met.

Figure 2:
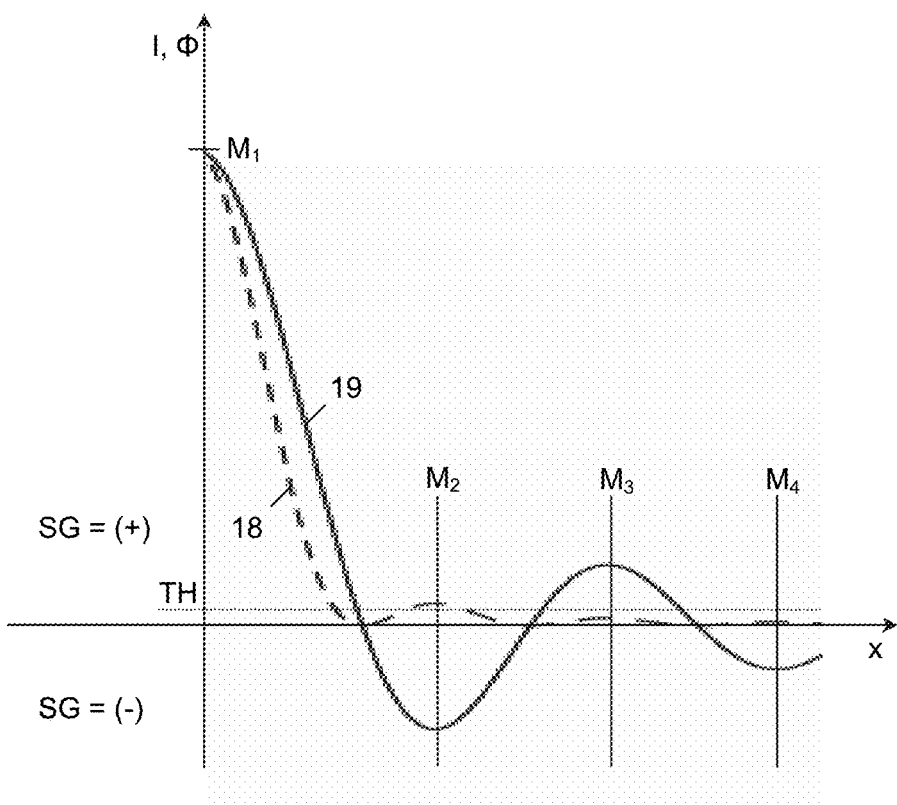
FIG. 2 shows a graph of an intensity distribution and a phase progression of a particle due to interference.

FIG. 2 shows the purpose of the two above-mentioned conditions. The dashed line 18 shows an idealized graph of the intensity I of an interference pattern, wherein the vertical axis shows the intensity I of a scattered light beam 11 in the reconstructed image $14_i$ and the horizontal axis shows a distance x to a point of scattering. The solid curve 19 shows an idealized graph of the phase $\Phi$ of an interference pattern, wherein the vertical axis shows the phase $\Phi$ of the scattered light beam 11 in the reconstructed image $14_i$ and the horizontal axis shows a distance x to a point of scattering. As can be seen, the graph 18 of the intensity has multiple maxima $M_1, M_2, M_3, \ldots$, and the phase graph 19 has extreme values at the same distance x, however where the intensity I has the second maximum $M_2$, the phase $\Phi$ has a first minimum.

It is an aim of the two above-mentioned criteria to exclude intensity values I other than those corresponding to the first maximum $M_1$. Therefore, the predetermined threshold TH is e.g. chosen to lie between the intensity value I of the second and third maximum $M_2, M_3$. The reason for not choosing a higher threshold TH, i.e., between the first and the second maximum $M_1, M_2$ is that this would exclude intensity values of particles of smaller sizes. To also exclude the second maximum $M_2$, the second criterion of excluding pixels with a predetermined sign SG of the phase value $\Phi$ is introduced. In the embodiment of FIG. 2, said predetermined sign SG is a negative sign to exclude the second intensity maximum $M_2$.

Furthermore, said threshold value TH can optionally be predetermined "on the fly" to account for locally varying maximum intensities. To this end, the threshold value TH can be computed for each pixel 15 of the reconstructed image $14_i$ as a predetermined percentage of the average intensity values of pixels within a predetermined range to said pixel 15, e.g., only pixels surrounding said pixel 15 or additionally also including pixels surrounding said surrounding pixels 15. In this context, average also includes mean, mode, or any other statistical function.

The value assigned can be either a constant value, e.g., "1", or the intensity value I of the corresponding pixel of the reconstructed image $14_i$. Assigning no value either means assigning a "0" value or an empty string or an-other placeholder.

In FIG. 2, the phase graph 19 is depicted to have a positive value $\Phi$ at the distance x=0. The predetermined sign SG is thus negative to exclude the second intensity maximum $M_2$. However, the phase graph 19 could also have a negative phase value $\Phi$ at the distance x=0. This is de-pendent on two factors: Firstly on the side, seen in the direction of the light beam 9, of the sample 3 said focal point F of the optical device 4 is located on and secondly on the refractive index of the medium M in relation to the refractive index of the particles P. If the focal point F lies between the camera 5 and the sample 3, and the refractive index of the medium M is lower than the refractive index of the particles P, the phase value $\Phi$ is positive at the center of a corresponding particle P such that the predetermined sign SG will be negative. If any one of those two factors change, the predetermined sign SG will have to be changed too.

Once the processor 7 has assigned a value or no value to all pixels 17 of all presence images $16_i$, the three-dimensional particle distribution 6 can be identified from those pixels 17 of the presence images 16$_i$ that have assigned values. To this end, the assigned values can be stored together with the coordinates (position of the respective pixel 17 within the array and relative position of the virtual plane 13$_i$ of the corresponding reconstructed image 14$_i$) or plotted as a three-dimensional view of the sample 3.

During or after assigning values to pixels 17 of the presence images 16$_i$, additional criteria can be used, too. For example, if a pixel 17 would be assigned a value but there are no surrounding pixels 17 that were or will be assigned values, also for this pixel 17 no value can be assigned even if the above mentioned criteria of intensity threshold TH and predetermined sign SG of the phase value $\Phi$ yield a value. This criterion is used, e.g., when particles are expected to occupy an area that is larger than one single pixel 17.

Once the three-dimensional particle distribution 6 has been determined, the method can be repeated after a predetermined amount of time to generate a second particle distribution 6. From the previous (first) particle distribution 6 and the second particle distribution 6, a movement of one or more particles P can be tracked. This can be done by correlating at least one particle P in the first particle distribution 6 to the same particle P in the second particle distribution 6. The correlation of particles P can either be performed manually or computationally by determining if one particle P has a similar position in the second particle distribution 6. The maximum deviation distance can be restricted by a maximum speed of particles, for example.

As another application the three-dimensional particle distribution 6 can be projected onto a two-dimensional plane corresponding to the plane of the interference image 12. By means of this, an "alternative" image can be generated that shows the particle distribution 6 in a front-view, just like the interference image 12 but without the influences of interference. Furthermore, similar projections could be made to planes other than the plane of the interference image 12 to generate different (virtual) views.

The disclosed subject matter is thus not restricted to the specific embodiments described in detail herein but encompasses all variants, combinations and modifications thereof.

What is claimed is:

1. A method for determining a three-dimensional particle distribution in a medium, comprising:
    providing a sample of the medium containing said particles;
    emitting a coherent light beam by means of a light source to irradiate the sample with said light beam, wherein a first part of the light beam is scattered by the particles to create a scattered light beam;
    recording, with a camera, an interference image of the scattered light beam and a second part of the light beam that has not been scattered;
    computing with a processor, from the interference image, for each one of a plurality of virtual planes lying within the sample, a reconstructed image of the sample at the respective virtual plane, each reconstructed image having a plurality of pixels with an intensity value and a phase value,
    generating with said processor, for each reconstructed image, a single presence image having a same layout of pixels as the reconstructed image, wherein a value is assigned to each pixel of the presence images if, according to a first condition, the corresponding pixel of the reconstructed image has an intensity value exceeding a predetermined threshold value and if also, according to a second condition, the corresponding pixel of the reconstructed image has a phase value with a predetermined sign, and wherein no value is assigned if at least one of said first and second conditions is not met, and
    identifying the three-dimensional particle distribution from those pixels of the presence images that have assigned values.

2. The method according to claim 1, further comprising, after scattering and before recording, directing the scattered light beam onto the camera by means of an optical device having a focal point lying outside of the sample.

3. The method according to claim 2, wherein said predetermined sign is dependent on a side, seen in the direction of the light beam, of the sample said focal point is located on as well as on a refractive index of the medium in relation to a refractive index of the particles.

4. The method according to claim 1, wherein the virtual planes are each spaced apart with predetermined intervals and cover the whole sample.

5. The method according to claim 1, wherein providing an inline interferometer comprising the light source, the sample, and the camera.

6. The method according to claim 1, comprising providing a digital camera as the camera.

7. The method according to claim 1, further comprising projecting the three-dimensional particle distribution onto a two-dimensional plane corresponding to a plane of the interference image.

8. The method according to claim 1, wherein the threshold value is computed for each pixel of at least one of the reconstructed images as a predetermined percentage of average intensity values of pixels within a predetermined range of said pixel.

9. The method according to claim 1, further comprising determining the threshold value to lie between a second and a third maximum intensity value of a reference intensity distribution.

10. The method according to claim 1, further comprising repeating emitting, irradiating, recording, generating, and identifying to determine a first and a second particle distribution, and correlating at least one particle in the first particle distribution to the same particle in the second particle distribution to track a movement of said particle.

* * * * *